(12) United States Patent
Derras (10) Patent No.: US 10,069,653 B1
(45) Date of Patent: Sep. 4, 2018

(54) BLIND PARTIAL RESPONSE EQUALIZATION

(71) Applicant: Seagate Technology LLC, Cupertino, CA (US)

(72) Inventor: Belkacem Derras, Longmont, CO (US)

(73) Assignee: SEAGATE TECHNOLOGY LLC, Cupertino, CA (US)

(*) Notice: Subject to any disclaimer, the term of this patent is extended or adjusted under 35 U.S.C. 154(b) by 0 days.

(21) Appl. No.: 15/594,140

(22) Filed: May 12, 2017

(51) Int. Cl.
*H04L 25/03* (2006.01)

(52) U.S. Cl.
CPC .... *H04L 25/0305* (2013.01); *H04L 25/03949* (2013.01)

(58) Field of Classification Search
USPC .......................................... 375/229, 233, 232
See application file for complete search history.

(56) References Cited

U.S. PATENT DOCUMENTS

| | | | |
|---|---|---|---|
| 5,282,225 A | 1/1994 | Nikias et al. | |
| 5,432,818 A * | 7/1995 | Lou .................... | H03H 21/0012 375/233 |
| 5,517,213 A * | 5/1996 | Bhatt ................. | H04L 25/0305 375/229 |
| 6,633,606 B1 | 10/2003 | Oh | |
| 6,668,014 B1 | 12/2003 | Endres et al. | |
| 7,433,400 B2 | 10/2008 | De Castro et al. | |
| 7,769,093 B2 | 8/2010 | Zhou | |
| 8,335,440 B2 | 12/2012 | Krause et al. | |
| 8,773,793 B1 | 7/2014 | McFayden et al. | |
| 9,401,826 B2 | 7/2016 | Eitel et al. | |
| 9,538,537 B1 | 1/2017 | Cui et al. | |
| 9,559,875 B2 | 1/2017 | Liu et al. | |
| 2008/0297937 A1* | 12/2008 | Eleftheriou ........ | G11B 5/00817 360/65 |
| 2010/0085362 A1* | 4/2010 | Tan .................... | H04L 25/0216 345/440 |
| 2011/0055665 A1* | 3/2011 | Lee ................... | G11B 20/10055 714/769 |
| 2011/0243561 A1* | 10/2011 | Li ........................ | H04B 10/611 398/65 |
| 2011/0317533 A1* | 12/2011 | Tachino ............. | G11B 7/00456 369/53.23 |
| 2013/0107932 A1* | 5/2013 | Scholand ............ | H04B 7/0452 375/229 |
| 2014/0211838 A1* | 7/2014 | Yu ....................... | H04L 27/3818 375/233 |
| 2015/0043926 A1 | 2/2015 | Levy et al. | |

OTHER PUBLICATIONS

Proakis, John G., "Digital Communications", McGraw-Hill, Fourth Edition, published Aug. 28, 2000, 937 pages.

(Continued)

*Primary Examiner* — Eva Puente
(74) *Attorney, Agent, or Firm* — Westman, Champlin & Koehler, P.A.

(57) ABSTRACT

An equalizer and an equalization method. The method includes receiving a data signal over a channel. The method further includes equalizing the data signal, by a blind partial response equalizer circuit, to provide an equalized output of the data signal. An estimation of partial response equalizer taps employed to determine the equalized output, by the blind partial response equalizer circuit, is carried out independently of true channel input symbols and detected symbols corresponding to the data signal.

20 Claims, 8 Drawing Sheets

(56) References Cited

OTHER PUBLICATIONS

Vaseghi, Saeed V., "Advanced Digital Signal Processing and Noise Reduction", John Wiley and Sons, Fourth Edition, Chapter 16, published Feb. 6, 2008, 13 pages.
Zarzoso, Vicente et al., "Optimal Step-Size Constant Modulus Algorithm", IEEE Translations on Communications, vol. 56, No. 1, Jan. 2008, 4 pages.
Moon, Jaekyun et al., "Equalization for Maximum Likelihood Detectors", IEEE Transactions of Magnetics, vol. 31, No. 2, Mar. 1995, 6 pages.
Johnson, Jr., C. Richard et al., "Blind Equalization Using the Constant Modulus Criterion: A Review", Proceedings of the IEEE, vol. 86, No. 10, Oct. 1998, 24 pages.
Ryan, Daniel J. et al., "Blind Detection of PAM and QAM in Fading Channels", IEEE Transactions on Information Theory, vol. 52, No. 3, Mar. 2006, 10 pages.
Sharma, Vinod et al., "Convergence and Performance Analysis of Godard Family and Multimodulus Algorithms for Blind Equalization", IEEE Transactions on Signal Processing, vol. 53, No. 4, Apr. 2005, 14 pages.
Godard, Dominique N., "Self-Recovering Equalization and Carrier Tracking in Two-Dimensional Data Communication Systems", IEEE Transactions on Communications, vol. COM-28, No. 11, Nov. 1980, 9 pages.
Sato, Yoichi, "A Method of Self-Recovering Equalization for Multilevel Amplitude-Modulation Systems", IEEE Transactions on Communications, Jun. 1975, 4 pages.
Haykin, Simon, "Adaptive Filter Theory", Prentice Hall, Fourth Edition, Published Sep. 14, 2001, 920 pages.

\* cited by examiner

BLIND PARTIAL RESPONSE EQUALIZATION

BACKGROUND

Data communication channels are used to transmit and receive information in an efficient and reliable manner. Such channels are utilized in a variety of applications from wireless communication networks, such as mobile cellular and satellite communication systems, to computer data storage devices, such as hard disk drives. When data is transmitted over a channel, unwanted phenomena such as inter-symbol interference (ISI), which is a form of distortion of a signal in which one symbol interferes with previous and/or subsequent symbols, may occur, thereby making the communication less reliable. To improve communication reliability, ISI needs to be undone or at least reduced.

SUMMARY

The present disclosure generally relates to an equalizer that is capable of undoing or at least reducing ISI and noise effects introduced into an input sequence by a channel that transmits that sequence.

In one embodiment, an equalization method is provided. The method includes receiving a data signal over a channel. The method further includes equalizing the data signal, by a partial response equalizer circuit, to provide an equalized output of the data signal. An estimation of partial response equalizer taps employed to determine the equalized output, by the partial response equalizer circuit, is carried out independently of true channel input symbols and detected symbols corresponding to the data signal.

Other features and benefits that characterize embodiments of the disclosure will be apparent upon reading the following detailed description and review of the associated drawings.

DETAILED DESCRIPTION OF ILLUSTRATIVE EMBODIMENTS

Embodiments of the disclosure relate to a "blind" partial response equalization technique in which an estimation of partial response equalizer taps or correction factors employed to determine an equalized output of a received data signal is carried out independently of true channel input symbols and detected symbols corresponding to the data signal. However, prior to providing additional details regarding the different embodiments, a description of an illustrative operating environment is provided below in connection with FIGS. 1 and 2.

Figure 1:
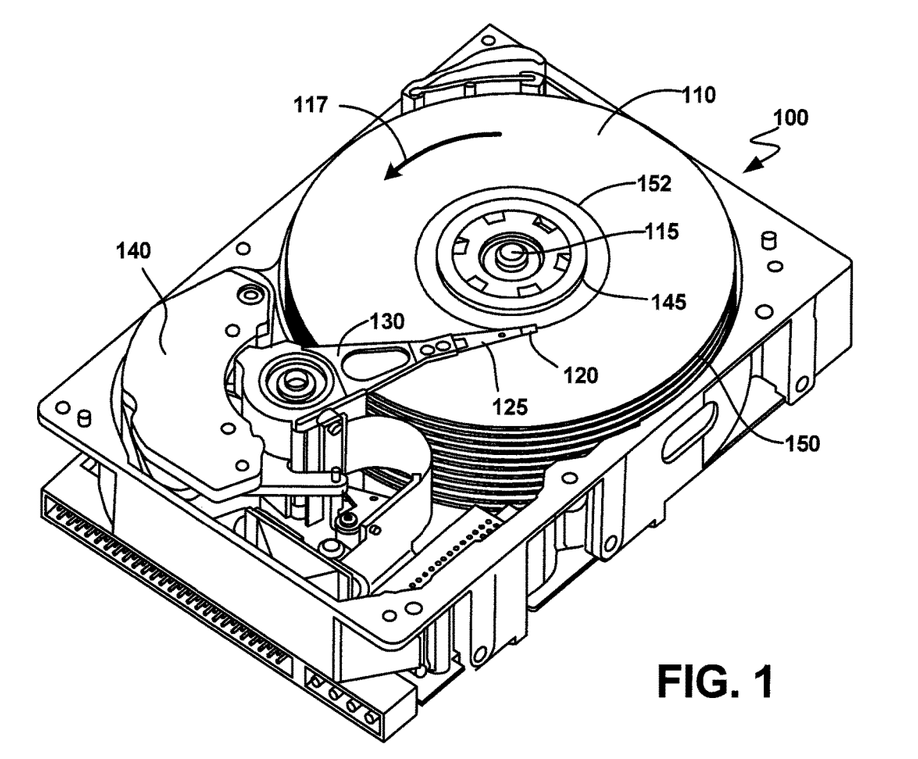
FIG. 1 is a perspective view of a data storage system.
Figure 2:
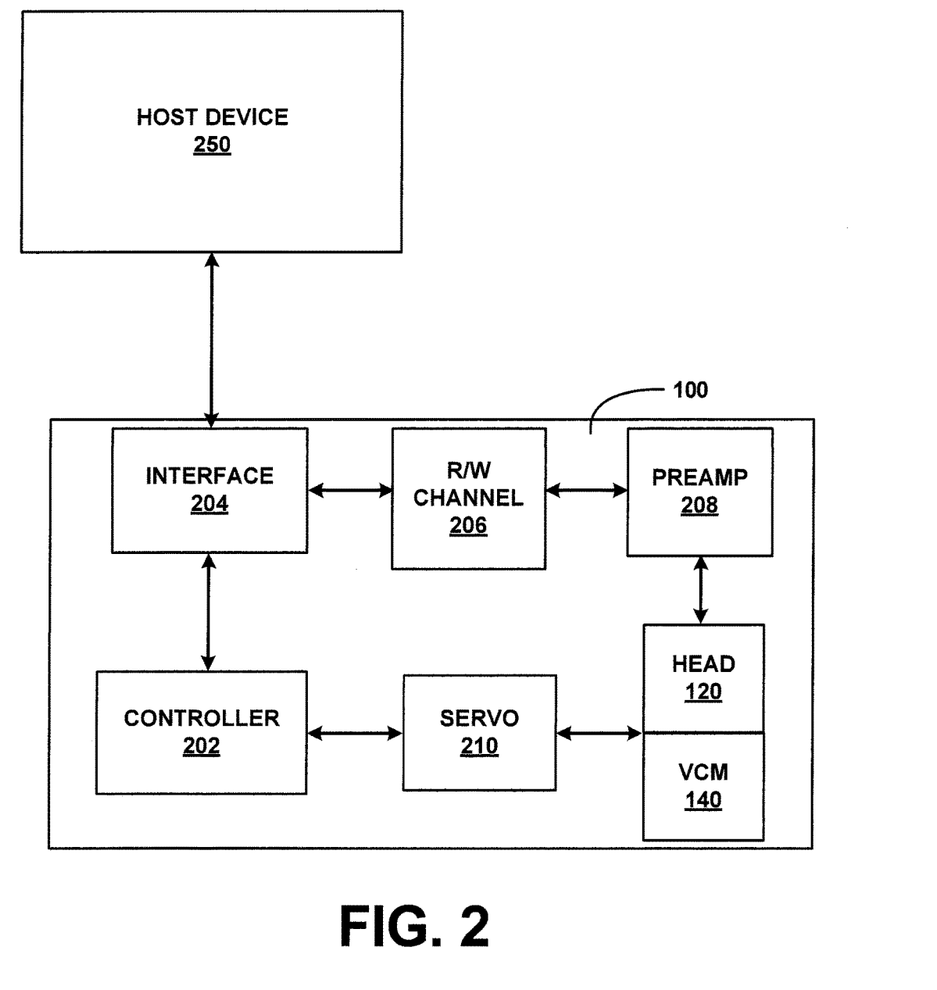
FIG. 2 is a generalized functional block diagram of a data storage system.

FIGS. 1 and 2 together show an illustrative operating environment in which certain embodiments disclosed herein may be incorporated. The operating environment shown in FIGS. 1 and 2 is for illustration purposes only. Embodiments of the present disclosure are not limited to any particular operating environment such as the operating environment shown in FIGS. 1 and 2. Embodiments of the present disclosure are illustratively practiced within any number of different types of operating environments.

FIG. 1 is a perspective view of a hard disk drive 100. Hard disk drives are a common type of data storage system. While embodiments of this disclosure are described in terms of disk drives, other types of data storage systems should be considered within the scope of the present disclosure. The same reference numerals are used in different figures for same or similar elements.

Disk drive 100 includes a data storage medium (for example, a magnetic disk) 110. Those skilled in the art will recognize that disk drive 100 can contain a single platter or multiple platters. Medium 110 is mounted on a spindle motor assembly 115 that facilitates rotation of the medium about a central axis. An illustrative direction of rotation is shown by arrow 117. Each disk surface has an associated recording head 120 that carries a read transducer and a write transducer for communication with the surface of the disk. Each head 120 is supported by a head gimbal assembly 125. Each head gimbal assembly (HGA) 125 illustratively includes a suspension and a HGA circuit. Each HGA circuit provides electrical pathways between a recording head and associated hard disk drive electrical components including preamplifiers, controllers, printed circuit boards, or other components. Each suspension mechanically supports an HGA circuit and a recording head 120, and transfers motion from actuator arm 130 to recording head 120. Each actuator arm 130 is rotated about a shaft by a voice coil motor assembly 140. As voice coil motor assembly 140 rotates actuator arm 130, head 120 moves in an arc between a disk inner diameter 145 and a disk outer diameter 150 and may be positioned over a desired track such as 152 to read and/or write data.

FIG. 2 is a generalized block diagram of illustrative control circuitry for the device shown in FIG. 1. The control circuitry includes a processor or controller 202 that directs or manages the high level operations of device 100. An interface circuit 204 facilitates communication between device 100 and a host device 250. A read/write channel 206 operates in conjunction with a preamplifier/driver circuit (preamp) 208 to write data to and to read data from a data storage medium such as medium 110 in FIG. 1. Preamp 208 also optionally acts as a power supply to electrical components included in a recording head such as a read transducer, a write transducer, heaters, etc. Preamp 208 is illustratively electrically connected to recording head 120 through a HGA circuit that is connected to preamp 208 and to one or more recording head 120 electrical connection points. A servo circuit 210 provides closed loop positional control for voice coil motor 140 that positions recording head 120.

Figure 3:
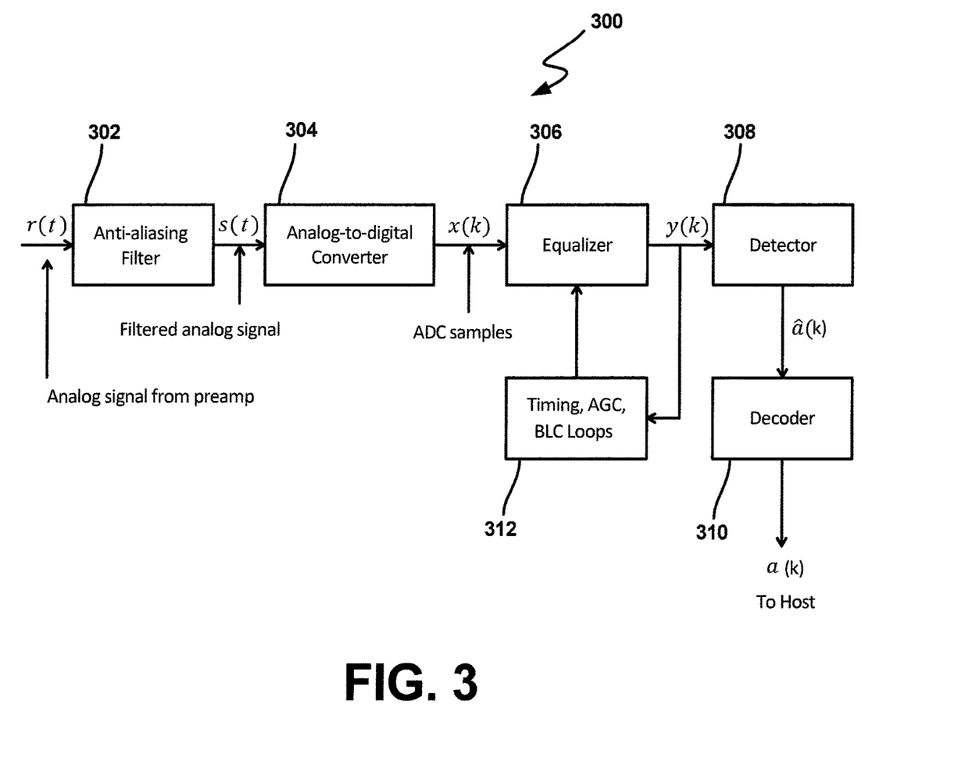
FIG. 3 is a block diagram of a read portion of read/write channel shown in FIG. 2.

FIG. 3 is a block diagram of a read portion 300 of read/write channel 206 of FIG. 2. Read channel portion 300 of FIG. 3 includes an anti-aliasing filter 302, an analog-to-digital converter (ADC) 304, an equalizer 306, a detector 308 and a decoder 310. Also included are a timing control loop, an automatic gain control (AGC) loop and a baseline compensation (BLC) loop. Those loops are represented by a single box 312 in FIG. 3.

During a read operation in disk drive 100 (of FIG. 1), the read transducer within head 120 (of FIGS. 1 and 2) senses or detects, for example, magnetization patterns on medium 110 of FIG. 1. Detected signals from the read transducer are provided to preamp 208 (of FIG. 2), which amplifies the detected signal(s). An analog signal from the preamp 208 (denoted by r(t) in FIG. 3) is provided to anti-aliasing filter 302, which filters r(t) to remove certain undesired components of r(t), and outputs a filtered analog signal s(t). Analog signal s(t) is digitized by ADC 304, which outputs ADC samples x(k). Samples x(k) are input into equalizer 306, which removes/undoes at least some of the inter-symbol interference (ISI) in x(k) and provides an equalized output y(k) to detector 308. In response to receiving y(k), detector 308 provides a best estimate of channel input symbols â(k). Symbols â(k) are input into decoder 310, which provides a decoded output a(k) that is sent to a host device such as 250 of FIG. 2.

As indicated above, in some embodiments, an estimation of partial response equalizer taps employed to determine the equalized output y(k), by equalizer 306, is carried out blindly (e.g., independently of the true channel input symbols and the detected symbols). Prior to providing details regarding blind partial response equalizers in accordance with embodiments of the disclosure, descriptions regarding full-response and partial-response equalization are provided below in connection with FIGS. 4 and 5, respectively.

Different types of equalizers may be employed for different types of channels. One example of an equalizer that may be suitable for certain types of channels is a zero-forcing (ZF) equalizer, which tends to force the ISI to zero. In the case of a ZF equalizer, a channel frequency response $H(\omega)$ and an equalizer frequency response $F(\omega)$ are related via $$H(\omega)F(\omega)=1 \qquad \text{Equation 1}$$

which gives $$F(\omega)=1/H(\omega) \qquad \text{Equation 2}$$

where $\omega$ is an angular frequency given in radians/second. Such an equalizer is supposed to fully recover the input channel symbols. However, it may present some drawbacks such as amplification of noise at or near spectral nulls of $H(\omega)$.

A more elaborate equalizer is a Wiener equalizer, which is based on minimizing a mean square error (MSE) criterion $$J(f) = E[(a_k - y_k)^2] \qquad \text{Equation 3}$$
$$= E\left[\left(a_k - \sum_{i=0}^{M-1} f_i x_{k-i}\right)^2\right]$$
$$= E[(a_k - f^T x_k)^2]$$

where E represents an expectation operator, $a_k$ and $y_k$ are, respectively, a channel input sequence (or true channel input symbols) and an equalizer output, the column vector $f=(f_0, f_1, \ldots, f_{M-1})^T$ contains equalizer taps, and the column data vector $x_k=(x_k, x_{k-1}, \ldots, x_{k-M+1})^T$ contains M entries of a noisy channel output (which is also the equalizer input) given by $x_k=s_k+n_k$, where $s_k$ is a noiseless channel output and $n_k$ is the channel additive noise. The minimization of Equation 3 with respect to f results in the following Wiener-Hopf equations, which can be solved for the equalizer tap vector f $$R_x f = P_{xa} \qquad \text{Equation 4}$$

where $R_x = E(x_k x_k^T)$ and $P_{xa} = E(x_k a_k)$.

From Equation 4, it is seen that, in the estimation of f, the knowledge of the channel input sequence $a_k$ or at least its estimate from a detector is utilized. The resulting equalizer is a full-response equalizer since it attempts to fully recover the channel input sequence $a_k$. An example of such an equalizer is briefly described below in connection with FIG. 4.

Figure 4:
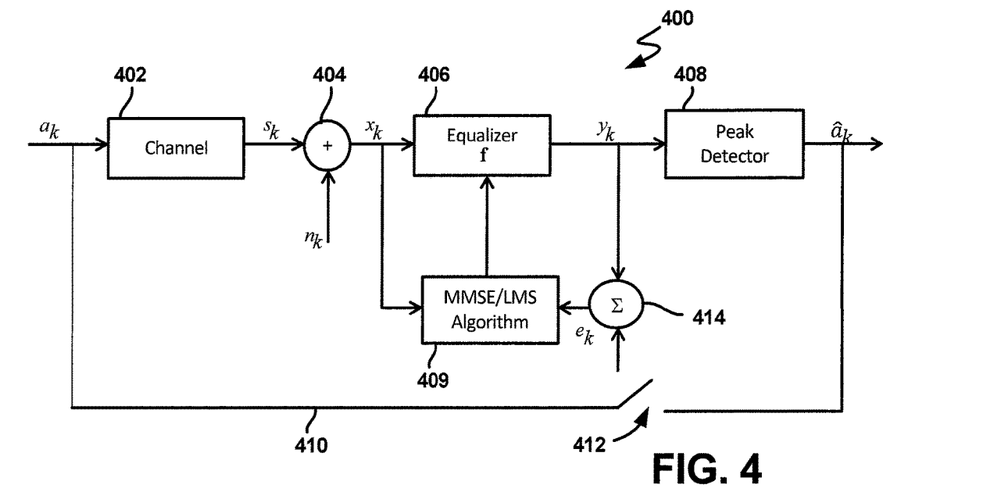
FIG. 4 is a block diagram that includes a full-response equalizer circuit.

FIG. 4 is block diagram 400 that illustrates an example of a full-response equalizer (e.g., a Wiener equalizer). In FIG. 4, $a_k$ represents a channel input sequence (e.g., data written on a data storage medium such as 110 of FIG. 1) and channel portion 402 may represent read processes for obtaining data from the data storage medium. In FIG. 4, $s_k$ represents a noiseless output from channel portion and $n_k$ represents channel additive noise, which is combined with $s_k$ at node 404 to provide a noisy channel output $x_k$, which contains ISI. Signal $x_k$ is fed to full-response equalizer 406, which removes the ISI from signal $x_k$ and provides an equalized output $y_k$. Equalizer output $y_k$ is provided to peak detector 408. Peak detector 408 provides an output $\hat{a}_k$, which may be a best estimate of channel input symbols. An algorithm used to estimate/update the filter taps of full-response equalizer 406 may be the minimum mean square error (MMSE)/least mean square (LMS) algorithm 409, which utilizes an error input $e_k$ that is a function of the channel input sequence $a_k$ and/or the detected sequence $\hat{a}_k$ and the equalizer output $y_k$ (as can be seen in feedforward/feedback loop portion 410, switch 412 and summing node 414).

As noted above, a full-response equalizer (e.g., the equalizer 406 of FIG. 4) attempts to fully recover the channel input sequence $a_k$, which means that the equalizer frequency response will approximate the inverse of the channel frequency response in the mean square error (MSE) sense, e.g.

$$F(\omega) \approx 1/H(\omega) \qquad \text{Equation 5}$$

More precisely, the equalizer frequency response takes the form $$F(\omega) = \frac{S_a(\omega) H^*(\omega)}{S_a(\omega)|H(\omega)|^2 + S_n(\omega)} \qquad \text{Equation 6}$$

where $S_a(\omega)$ and $S_n(\omega)$ are spectral densities of the channel input sequence $a_k$ and the channel additive noise $n_k$, respectively. If the equalizer input sequence $a_k$ is a random binary non-return-to-zero (NRZ) sequence with values −1 and +1, then $S_a(\omega)=1$. Also, if the additive noise sequence $n_k$ is white with a variance $$\sigma_n^2,$$

then the equalizer frequency response given by Equation 6 reduces to $$F(\omega) = \frac{H^*(\omega)}{|H(\omega)|^2 + \sigma_n^2} \qquad \text{Equation 7}$$

It can be seen that, in the case of high SNR (e.g., low noise variance), Equation 7 simply reduces to Equation 5.

So far, full equalization has been considered, in which case the equalizer is supposed to fully recover the channel input sequence $a_k$. With this method, as suggested by Equation 5 or Equation 7, either an infinite impulse response (IIR) equalizer or at least a lengthy finite impulse response (FIR) equalizer are employed. Both types of equalizers have drawbacks related to the propagation of fixed-point errors for IIR type and implementation complexity for the lengthy FIR type. To address these difficulties, a more relaxed type of equalizer has been suggested, called partial-response equalizer (PRE). Such an equalizer tends to equalize only a portion of the channel response $H(\omega)$, hence the name. In this case, the equalizer output sequence is not forced to be the channel input sequence or its approximation. Instead, the equalizer output is forced to be as close as possible (in the MSE sense) to a desired sequence $d_k$, which is assumed to be the output of an FIR system driven by the channel input sequence $a_k$. The impulse response of this FIR system is called the target response and considered as a shortened version of the channel impulse response. An example of a PRE is briefly described below in connection with FIG. 5.

Figure 5:
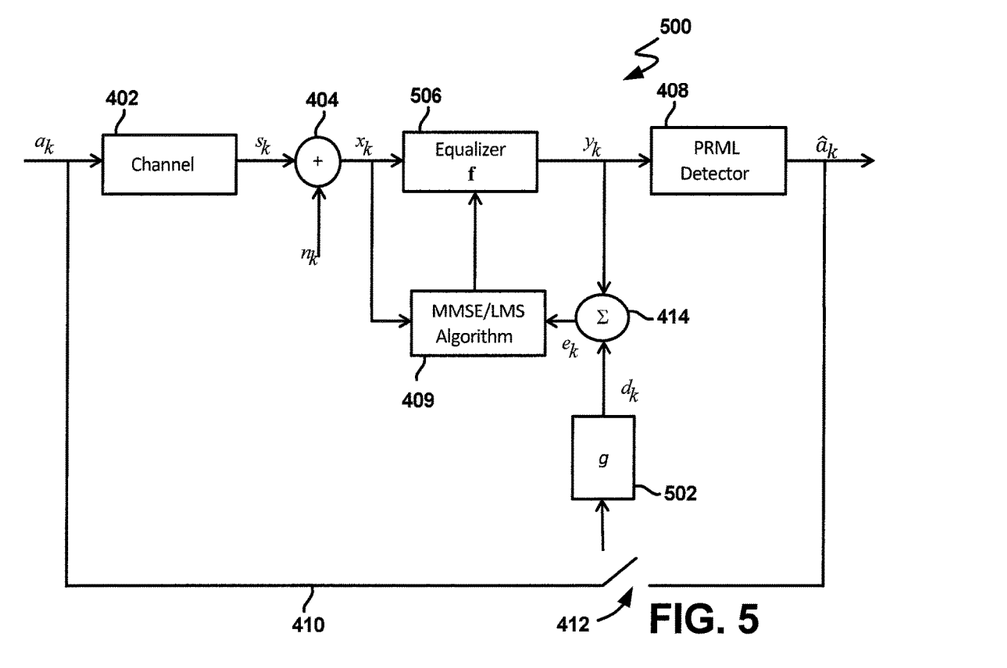
FIG. 5 is a block diagram that includes a partial-response equalizer circuit.

FIG. 5 is block diagram 500 that illustrates an example of PRE. Several elements included in FIG. 4 and described above are also included in FIG. 5. Therefore, in the interest of brevity, a description of those elements is not repeated in connection with FIG. 5. FIG. 5 differs from FIG. 4 in that it includes a target g, which is denoted by reference numeral 502, which outputs a desired sequence $d_k$ in FIG. 5. The addition of element 502 does not result in the elimination of feedback loop portion 410, which indicates that PRE 506, like the full-response equalizer 406 of FIG. 4, utilizes an error input $e_k$ that is a function of the desired signal $d_k$ (which is a function of the channel input sequence $a_k$ or its estimate) and the equalizer output $y_k$.

In a PRE of the type shown in FIG. 5, the desired sequence is expressed as $$d_k = \sum_{i=0}^{L_g-1} g_i a_{k-i} \qquad \text{Equation 8}$$

where each $g_i$ is a coefficient of the target impulse response with length $L_g$. The target g can be considered known (e.g. given) or unknown in which case a method called the generalized partial response (GPR) is used to estimate both the target coefficients and the equalizer taps simultaneously.

Using $d_k$ as the desired sequence in Equation 3 instead of $a_k$, results in the following set of equations $$R_x f = P_{xd} \qquad \text{Equation 9}$$

which can be solved for f, where again $R_x = E(x_k x_k^T)$ and $P_{xd} = E(x_k d_k)$. If the channel frequency response is given by the product $$H(\omega) = G(\omega) Q(\omega) \qquad \text{Equation 10}$$

then the frequency domain of the equalizer may be expressed as $$F(\omega) = \frac{S_d(\omega) Q^*(\omega)}{S_d(\omega) |Q(\omega)|^2 + S_n(\omega)} \qquad \text{Equation 11}$$

-continued
$$= \frac{S_a(\omega)|G(\omega)|^2 Q^*(\omega)}{S_a(\omega)|G(\omega)|^2 |Q(\omega)|^2 + S_n(\omega)}$$

where $s_d(\omega)$ and $G(\omega)$ are the spectral density of the desired sequence $d_k$ and the frequency response of the target g, respectively. Again here, if the channel input sequence $a_k$ is a random binary NRZ sequence with values −1 and +1 then, $s_a(\omega)=1$. Also, if the additive noise sequence $n_k$ is white with a variance $$\sigma_n^2,$$

then the equalizer frequency response given by Equation 11 reduces to $$F(\omega) = \frac{|G(\omega)|^2 Q^*(\omega)}{|G(\omega)|^2 |Q(\omega)|^2 + \sigma_n^2} \qquad \text{Equation 12}$$

In the case of high SNR (e.g., low noise variance) Equation 12 becomes $$F(\omega) \approx \frac{1}{Q(\omega)} \qquad \text{Equation 13}$$

A more general method, based on MSE criterion, has been suggested to estimate both the target response $g=(g_0, g_1, \ldots, g_{L_g-1})^T$ and the equalizer taps f and, as noted above, it is called a GPR method.

From FIGS. 4 and 5 and the description above, it is seen that both zero-forcing (ZF) and MMSE methods (with either full- or partial-response equalization) involve the knowledge of the channel input sequence $a_k$. This may be achieved through a training sequence or through some detected sequence. In the following sections a blind partial response equalization (BPRE) method is described, which does not involve any knowledge of the channel input sequence $a_k$. It primarily relies on the use of a target response g, which is assumed to be known or estimated beforehand.

As seen in the description above in connection with FIG. 5, MMSE PRE attempts to equalize the channel output $x_k$ to some desired signal $d_k$ that represents the output of some part of the channel $H(\omega)$ designated as $G(\omega)$ and called the target response. The knowledge of $d_k$ employs the knowledge of $a_k$ as shown in Equation 8. But since $a_k$ is usually a sequence of symbols with finite number of alphabets (e.g., a binary NRZ sequence) and $g_k$ represents an FIR filter, the signal $d_k$ will have a finite number of levels that are compared to the equalized signal $y_k$ in the MSE sense. One blind algorithm that deals with multi-level signals in communication systems is the constant modulus algorithm (CMA). This algorithm is derived from the constant modulus (CM) criterion that has a form $$I^p(f) = E[(|y_k|^p - \rho_p)^2] \qquad \text{Equation 14}$$

where the functional $I^p(f)$ is called the dispersion of order p (p is a positive integer), $y_k$ is the equalized signal, and the dispersion parameter $\rho_p$ is a positive real constant that depends on p and is given by $$\rho_p = \frac{E[|a_k|^{2p}]}{E[|a_k|^p]} \qquad \text{Equation 15}$$

where each $a_k$ is a channel input symbol.

Equation 14 shows that the CM criterion penalizes the dispersion of the p-raised output modulus $|y_k|^p$ away from the parameter $\rho_p$. The CM criterion seems to work for CM sources (such as M-ary phase shift keying (M-PSK)) as well as with non-CM sources.

If the levels of the desired signal $d_k$ are considered to represent the underlying symbols, then the criterion of Equation 14 can be applied to partial response equalization, where $\rho_p$ takes the form $$\rho_p = \frac{E[|\lambda_k|^{2p}]}{E[|\lambda_k|^p]} \qquad \text{Equation 16}$$

with $\lambda_k$ being the different levels of the desired signal $d_k$. Knowing that $d_k$ is simply the convolution of the channel input symbols $a_k$ with a given target $g_k$ of FIR type, the result is given as a finite number of levels. This is because the channel input symbols are generated from a finite set of alphabets and, as a particular case, the binary alphabet. Given the target impulse response $$g = (g_0, g_1, \ldots, g_{L_g-1})^T \qquad \text{Equation 17}$$

and the channel input alphabet with size q, the number of levels taken by $\lambda_k$ is $$L = q^{L_g} \qquad \text{Equation 18}$$

For the particular case when q=2 (e.g., when the channel input symbols $a_k$ are binary), the number of levels is given by $L=2^{L_g}$, which is used in the remaining portion of the description without loss of generality. Assuming a uniform distribution of $\lambda_k$s over the different levels and replacing the ensemble average with a time average in Equation 16 results in $$\rho_p = \frac{\sum_{k=0}^{L-2} |\lambda_k|^{2p}}{\sum_{k=0}^{L-1} |\lambda_k|^p} \qquad \text{Equation 19}$$

where $\lambda_k$s are computed using the following expression:

$$\Lambda = \begin{pmatrix} \lambda_0 \\ \vdots \\ \lambda_{L-1} \end{pmatrix} = A\tilde{g} \qquad \text{Equation 20}$$

$$= A \begin{pmatrix} g_{L_g-1} \\ \vdots \\ g_0 \end{pmatrix}$$

where the matrix A has $2^{L_g}$ rows given by the numbers 0, 1, 2, ..., $2^{L_g}-1$ and converted into binary form with $L_g$ bits, then converted into bipolar form, where the zeros are represents as −1's and the ones remain unchanged. As an example, given a length-three target $g=(3,8,13)^T$, A will be an 8×3 matrix $$A = \begin{pmatrix} -1 & -1 & -1 \\ -1 & -1 & 1 \\ -1 & 1 & -1 \\ -1 & 1 & 1 \\ 1 & -1 & -1 \\ 1 & -1 & 1 \\ 1 & 1 & -1 \\ 1 & 1 & 1 \end{pmatrix} \qquad \text{Equation 21}$$

Using Equation 20 with $\tilde{g}=(13,8,3)^T$, the corresponding desired levels are $$\Lambda = \begin{pmatrix} -24 \\ -18 \\ -8 \\ -2 \\ 2 \\ 8 \\ 18 \\ 24 \end{pmatrix} \qquad \text{Equation 22}$$

and using Equation 19, the dispersion parameter $\rho_p$ takes the values 18.6154 and 455.4380 for p=1 and p=2, respectively. This shows that, without knowing the channel input symbols $a_k$, the desired levels $\Lambda$ can be computed provided that the target g is given. Inversely, by choosing to impose some specific levels $\Lambda$ for the desired signal, an estimate of the corresponding target can be obtained as $$\tilde{g} = (A^T A)^{-1} A^T \Lambda \qquad \text{Equation 23}$$

As an example, given the desired levels $\Lambda=(-28,-20,-12,-4,4,12,20,28)^T$, the corresponding target will be of length 3 and estimated as $g=(4,8,16)^T$.

It should be noted that an objective of the partial response equalization is to shorten the channel impulse response, and hence shorten the ISI to the length of a specified target g, so that the detector complexity will be significantly reduced.

The partial response equalizer taps may be estimated blindly by minimizing the instantaneous version of the functional given by Equation 14 (e.g. without considering the expectation operator). The resulting stochastic gradient is $$\frac{\partial J^p(f)}{\partial f} = x_k e_k^p \qquad \text{Equation 24}$$

where $x_k$ is as defined in Equation 3 and $e_k^p$ is the error component that depends on p and is given by $$e_k^p = y_k |y_k|^{p-2}(|y_k|^p - \rho_p) \qquad \text{Equation 25}$$

The equalizer taps may be adapted using a gradient-based least mean squares (LMS) algorithm as follows:

$$f^{(k)} = f^{(k-1)} + \mu\left(-\frac{\partial J^p(f)}{\partial f}\right)_{f=f^{(k-1)}} \qquad \text{Equation 26}$$

$$= f^{(k-1)} - \mu x_k e_k^p$$

where $\mu$ is an adaptation step size that is selected to ensure the convergence of Equation 26.

For p=1 and p=2, the error reduces, respectively, to $$e_k^{(1)} = \text{sign}(y_k)(|y_k| - \rho_1) \quad \text{Equation 27}$$

and $$e_k^{(2)} = y_k(|y_k|^2 - \rho_2) \quad \text{Equation 28}$$

Figure 6:
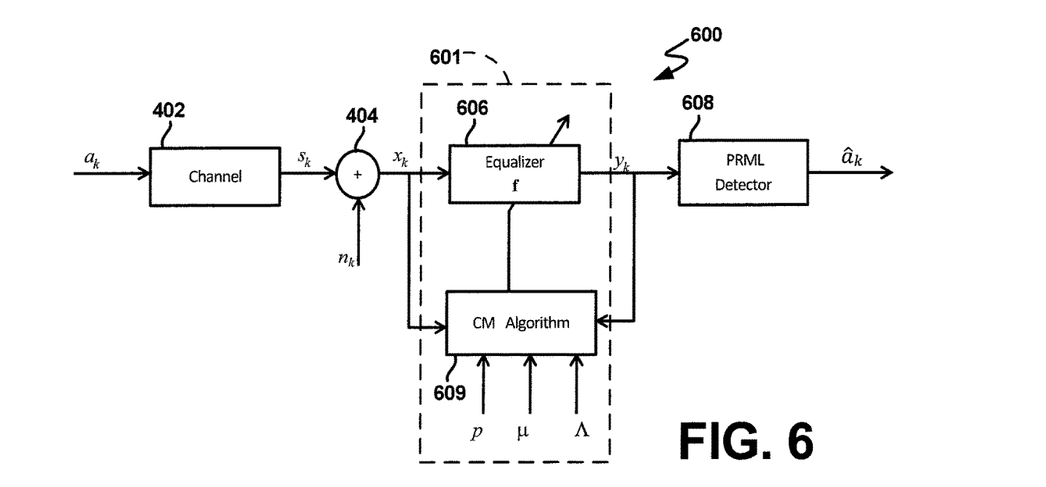
FIG. 6 is a block diagram that includes a single-input and single-output blind partial response equalizer circuit.

FIG. 6 shows a block diagram 600 that includes a BPRE circuit 601 that is an implementation of CMA as given by Equations 26-28, which does not utilize any input symbols for filter-tap computations. Several elements included in FIGS. 4 and 5 and described above are also included in FIG. 6. Therefore, in the interest of brevity, a description of those elements is not repeated in connection with FIG. 6. As can be seen in FIG. 6, BPRE circuit 601 includes an equalizer filter (e.g., an FIR filter) 606 and a "CM algorithm" block 609, which is described further below. One difference in FIG. 6 compared to FIGS. 4 and 5 is the absence of the feedforward loop 410 and the feedback loop 412 in FIG. 6, since equalizer filter 606 operates independently of any input symbols. Also, it should be noted that, in the embodiment of FIG. 6, detector 608 utilized after the equalizer filter 606 is of a partial-response maximum-likelihood (PRML) type. Such a detector 608 employs a Viterbi or Viterbi-like algorithm to obtain a best estimate of the channel input symbols $\hat{a}_k$ in the maximum-likelihood (ML) sense.

In FIG. 6, the block "CM Algorithm" 609 utilizes input parameters μ, p, and Λ to compute the error given by Equation 25 and to update the equalizer taps using Equation 26. A step size parameter μ may be optimized through an ad-hoc process by trial-and-error tests. For CMA, an optimum step size may be obtained at each iteration by finding the roots of a third degree polynomial in μ with coefficients that depend on the statistics of the signals $x_k$, $y_k$, and the gradient given by Equation 24. Of course, this optimization process adds more complexity to the algorithm. However, such complexity may be reduced by invoking the computation of the optimum step size after each N iterations, where N>1 is judiciously selected to have a suitable compromise between complexity and performance. Additional details regarding selection of step size parameter μ are provided further below.

BPRE circuit 601 of FIG. 6 is a single-input and single-output (SISO) equalizer circuit, which is suitable, for example, in embodiments of disk drive 100 (of FIG. 1) having a recording head 120 (of FIG. 1) that carries a read transducer (not separately shown) that includes a single sensor (not separately show) for sensing bit magnetizations from a desired track such as 152 on medium 110 (of FIG. 1). However, in some embodiments of disk drive 100, recording head 120 carries a read transducer that includes multiple sensors (not separately shown) that substantially simultaneously sense bit magnetizations form track 152. Here, signals sensed by individual ones of the multiple sensors are combined to provide a read signal. For use in such embodiments, the SISO equalizer may be modified to operate in a multiple-input and single-output (MISO) configuration.

Figure 7:
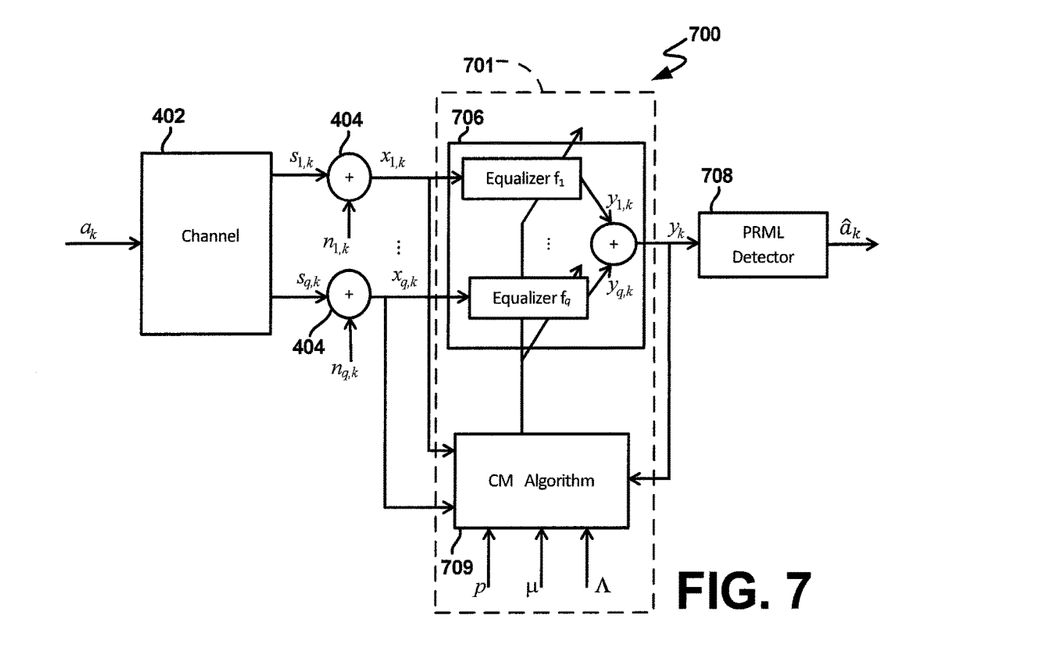
FIG. 7 is a block diagram that includes a multiple-input and single-output blind partial response equalizer circuit.

The extension of the CMA described above to a MISO equalizer is straightforward, knowing that the MISO equalizer taps are stacked as one column vector and updated using an expression similar to Equation 26 (see Equation 33 below). FIG. 7 shows a block diagram 700 that includes a MISO BPRE circuit 701. As shown in FIG. 7, CMA implementation for MISO equalizer filter portion 706 is similar to that of SISO equalizer filter 606 of FIG. 6, except that MISO equalizer filter portion 706 includes a bank of FIR filters whose outputs are combined to produce the overall output $y_k$. Given the MISO equalized output $y_k$, the error signal for the MISO BPRE circuit 701 is calculated using the general expression given by Equation 25.

For a channel with input $a_k$ and q noisy outputs $x_{1,k}$, $x_{2,k}$, ..., $x_{q,k}$, the MISO equalizer 702 should include a bank of q FIR filters with inputs $x_{1,k}$, $x_{2,k}$, ..., $x_{q,k}$ and corresponding tap vectors $f_1$, $f_2$, ..., $f_q$, respectively, as shown in FIG. 7. In this case, the overall equalizer output $y_k$ takes the form $$y_k = \sum_{i=1}^{q} y_{i,k} \quad \text{Equation 29}$$

$$= \sum_{i=1}^{q} f_i^T x_{i,k}$$

$$= F^T X_k$$

where $$X_k = (x_{1,k}^T, x_{2,k}^T, \ldots, x_{q,k}^T)^T \quad \text{Equation 30a}$$

$$x_{i,k} = (x_{i,k}, x_{i,k-1}, \ldots, x_{i,k-M+1})^T, \quad i=1,2,\ldots,q \quad \text{Equation 30b}$$

$$F = (i\ f_1^T, f_2^T, \ldots, f_q^T)^T \quad \text{Equation 30c}$$

The constant modulus criterion given by Equation 14 becomes $$J^p(F) = E[(|y_k|^p - \rho_p)^2] \quad \text{Equation 31}$$

where $\rho_p$ and $y_k$ are given by Equation 19 and Equation 29, respectively. Then the stochastic gradient of Equation 31 takes the form $$\frac{\partial J^p(F)}{\partial F} = X_k e_k^p \quad \text{Equation 32}$$

where $e_k^p$ and $X_k$ are given by Equation 25 and Equation 30a, respectively. Equation 25 may utilize $y_k$ as defined by Equation 29 for MISO BPRE circuit 701. To this end, the MISO equalizer F may be updated using $$F^{(k)} = F^{(k-1)} + \mu \left( -\frac{\partial J^p(F)}{\partial F} \right)_{F=F^{(k-1)}} \quad \text{Equation 33}$$

$$= F^{(k-1)} - \mu X_k e_k^p$$

where μ is the adaptation step size, which may be selected to ensure the convergence of Equation 33.

An implementation of Equation 33 is shown in FIG. 7, which includes a block "CM Algorithm" 709 in circuit 701 with inputs given by μ, p, and Λ. Block 709 computes an error $e_k^p$ using Equation 25 and updates the equalizer taps F using Equation 33. As in the SISO embodiment of FIG. 6, the MISO embodiment of FIG. 7 employs a detector 708 of a PRML type, based on a Viterbi or Viterbi-like algorithm, to de-convolve the signal $y_k$ and produce an ML estimate of the channel input symbols $\hat{a}_k$.

Figure 8:
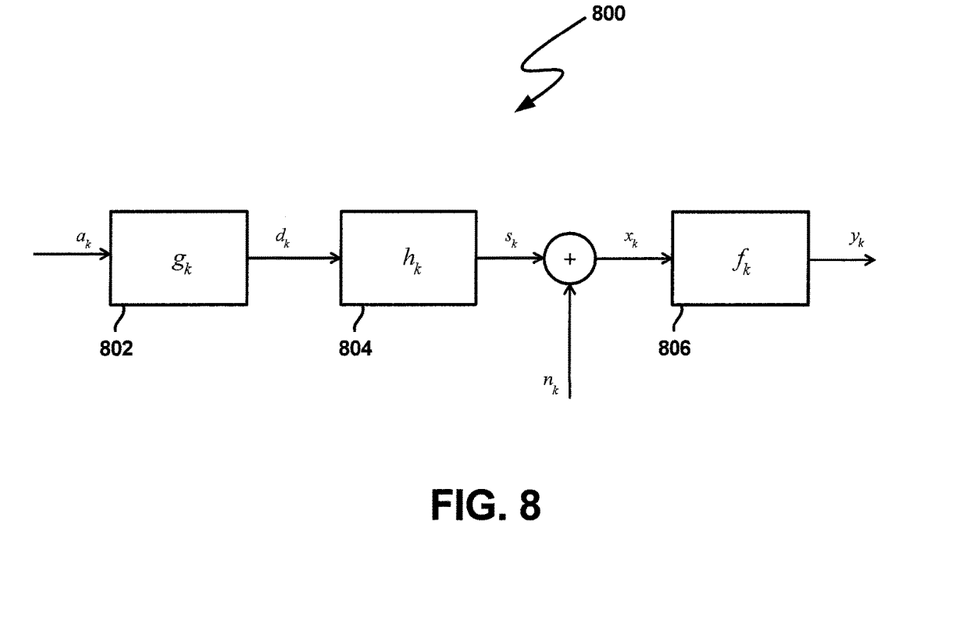
FIG. 8 is a block diagram of a combined channel equalizer.

FIG. 8 is a block diagram of a combined channel equalizer 800 that shows a factorization of the overall channel into two blocks: the target response $g_k$ and the remaining response $h_k$ of the channel. In partial response equalization, the equalizer output is sought to match a desired signal that is the output of a hypothetical system called the target. This hypothetical system has an impulse response that is a fraction of the channel impulse response. As shown in FIG. 8, an overall channel response may be decomposed as the target response $g_k$ (box 802 in FIG. 8) and another impulse response $h_k$ (box 804 in FIG. 8), such that the overall channel impulse response is $(g*h)_k$, where * denotes the convolution operation. Since the equalizer $f_k$ (box 806 in FIG. 8) is supposed to have an output $y_k$ that matches the desired signal $d_k$, then in an ideal situation (e.g., ignoring the noise) the combined response $(h*f)_k=1$. However, in a practical case $$(h*f)_k = q_k \quad \text{Equation 34}$$

where $q_k$ is the impulse response representing the remaining ISI before convergence. Here, $q_k$ is expected to have non-zero elements other than $q_0$ at the beginning of the CMA adaptation, but the non-zero length of $q_k$ may decrease with the increasing number of iterations so that near convergence, the dominant element of $q_k$ will be $q_0$.

Going back to the CM criterion given by Equation 14 or Equation 31, $y_k$ may be expressed in terms of $q_k$ and $d_k$ as $$J^{(p)}(q) = E[(|\Sigma_i d_{k-i} q_i|^p - \rho_p)^2] \quad \text{Equation 35}$$

The behavior of $q_k$ during the CMA adaptation will indicate the trend of the convergence process. In this case, the derivative of Equation 35 with respect to q is a suitable metric to measure the convergence of Equation 26 or Equation 33.

Using p=2 and differentiating Equation 35 with respect to q gives $$\frac{\partial J^{(2)}(q)}{\partial q_l} = 4E\left[d_{k-l}\left|\sum_i d_{k-i}q_i\right|\left(\left|\sum_i d_{k-i}q_i\right|^2 - \rho_p\right)\right], \quad \text{Equation 36}$$

$$l = 0, 1, 2, \ldots$$

If Equation 36 is set to zero and an assumption is made that the symbols $d_k$ are uncorrelated, the following is obtained:

$$q_l\{E(d_k^4)(q_l^2-1)+2(E(d_k^2))^2\Sigma_{i\neq l}q_i^2\}=0, \forall l \quad \text{Equation 37}$$

There are an infinite number of solutions $q_l$ to Equation 37. A general solution has all taps $\{q_k\}$ equal to zero, except K of them that have equal magnitude $\sigma_K^{(2)}$ $$\sigma_K^{(2)} = \frac{E(d_k^4)}{(E(d_k^4) + 2(K-1)(E(d_k^2))^2)}, \quad K = 1, 2, \ldots \quad \text{Equation 38}$$

The case with K=1 represents an ideal case for equalization with zero ISI. With K>1, more and more taps $\{q_k\}$ that are different from zeros are present and hence the presence of more ISI. If a convergence is in order, the number of non-zero $q_k$s should decrease as the number of iterations increases. At the equalizer output, the energy and the dispersion functional may be computed as $$E_K = \frac{KE[|d_k|^4]E[|d_k|^2]}{E[|d_k|^4] + 2(K-1)(E[|d_k|^2])^2} \quad \text{Equation 39}$$

$$J_K^{(2)} = \rho_2^2 - \frac{K(E[|d_k|^4])^2}{E[|d_k|^4] + 2(K-1)(E[|d_k|^2])^2} \quad \text{Equation 40}$$

If the levels of the desired signal $d_k$ satisfy the condition $$E[|d_k|^4] < 2(E[|d_k|^2])^2 \quad \text{Equation 41}$$

then for K>0, the energy of the equalizer output and the dispersion functional satisfy $$I_K^{(2)} < J_{K+1}^{(2)} \quad \text{Equation 42}$$

$$E_K > E_{K+1} \quad \text{Equation 43}$$

This indicates that as K decreases the dispersion functional decreases and converges to its minimum, which is reached for K=1 with zero ISI. At this point, the equalizer output energy reaches its maximum value. Therefore, the initialization of the equalizer taps in Equation 26 or Equation 33 may be performed such that the energy at the equalizer output is sufficiently large, at least greater than $E_2$.

It should be noted that Equation or condition 41 assumes that $g_0=1$. A more general condition may be $$E[|d_k|^4] < 2q_0^2(E[|d_k|^2])^2 \quad \text{Equation 44}$$

which gives an indication of how to initialize the equalizer taps. In particular, the main tap may be initialized such that $$f_0^2 > \frac{E[|d_k|^4]}{2h_0^2(E[|d_k|^2])^2} \quad \text{Equation 45}$$

where $h_0$ is the main coefficient of the impulse response of the block $\{h_k\}$ of the channel. In simulations described further below, the main equalizer tap $f_0$ is initialized to the value 10 which meets the condition given by Equation 45.

For the convergence analysis using dispersion with p=1, the differentiation of Equation 35 with respect to q leads to $$\frac{\partial J^{(1)}(q)}{\partial q_l} = \quad \text{Equation 46}$$

$$E\left[d_{k-l}\sum_i q_i d_{k-i}\left|\sum_m q_m d_{k-m}\right|^{-1}\left(\left|\sum_m q_m d_{k-m}\right| - \rho_1\right)\right]$$

Setting the gradient (Equation 46) to zero will give the different solutions $$q_l = \frac{1}{E[|d_k|]}E\left[\frac{d_{k-l}\sum_i q_i d_{k-i}}{\left|\sum_i q_i d_{k-i}\right|}\right], \forall l \quad \text{Equation 47}$$

$$= \frac{1}{E[|d_k|]}E\left[d_{k-l}\text{sign}\left(\sum_i q_i d_{k-i}\right)\right], \forall l$$

As in the case with p=2, in connection with Equation 47 an infinite number of solutions that can be defined such that for each solution all the coefficients $\{q_l\}$ are equal to zero, except K of them. The K nonzero coefficients $\{q_l\}$ have the same magnitude $$\sigma_K^{(1)} = \frac{1}{E[|d_k|]}E\left[\frac{d_{k-l}\sum_{i=0}^{K-1} d_{k-i}}{\left|\sum_{i=0}^{K-1} d_{k-i}\right|}\right], K \geq 1 \quad \text{Equation 48}$$

-continued $$= \frac{1}{E[|d_k|]} E\left[d_{k-l} \text{sign}\left(\sum_{i=0}^{K-1} d_{k-i}\right)\right], K \geq 1$$

From Equation 48 it is clear that K=1 represents a case with no ISI, which is a state to which Equation 35 with p=1 may converge after a large number of iterations. It should be noted here that, in practice, zero ISI should be understood in an approximate sense.

Referring back to FIGS. 6 and 7, each of CM algorithm blocks 606 and 706 includes inputs given by $\mu$, p, and $\Lambda$. A selection of step size parameter $\mu$ is described below in connection with Equations 49-56.

Taking the CM criterion according to Equation 14 and replacing f with its iterative expression as given by Equation 26 or Equation 33 in terms of $\mu$ and the gradient $g=x_k e_k^p$, yields a functional expressed as a function of the step size $\mu$ $$J^{(p)}(\mu) = E[(|(f-\mu g)^T x_k|^p - \rho_p)^2] \quad \text{Equation 49}$$

An optimum step size should be a value of $\mu$ that minimizes Equation 49. Therefore, the gradient of Equation 49 with respect to $\mu$ provides a desired solution $$\frac{\partial J^{(p)}(\mu)}{\partial \mu} = 2pE\Big[(|(f - \mu g)^T x_k|^p - \rho_p) \quad \text{Equation 50}$$

$$|(f - \mu g)^T x_k|^{p-2}(f - \mu g)^T x_k(-g^T x_k)\Big]$$

where g is a gradient vector as given by Equation 24 or Equation 32. Thus, in terms of $\mu$, f, g, and the data vector $x_k$ and for p=1 and p=2, Equation 50 may be written as $$\frac{\partial J^{(1)}(\mu)}{\partial \mu} = E[(|y_k - \mu z_k| - \rho_1)\text{sign}(y_k - \mu z_k)(-z_k)] \quad \text{Equation 51}$$

$$= E[(y_k - \mu z_k - \rho_1 \text{sign}(y_k - \mu z_k))(-z_k)]$$

$$\frac{\partial J^{(2)}(\mu)}{\partial \mu} = E[((y_k - \mu z_k)^2 - \rho_2)(y_k - \mu z_k)(-z_k)] \quad \text{Equation 52}$$

where $$y_k = f^T x_k \quad \text{Equation 53a}$$

$$z_k = g^T x_k \quad \text{Equation 53b}$$

The development of Equation 51 and Equation 52 show that the gradient of Equation 49 with respect to $\mu$ has the form of a first and third degree polynomial for p=1 and p=2, respectively. By setting those polynomials to zero, we can get the optimum step size $\mu$ to be used in the adaptation of the equalizer taps. From Equation 51 and Equation 52, the polynomials take the form $$P^{(1)}(\mu) = a_0 \mu + a_1 \quad \text{Equation 54a}$$

$$P^{(2)}(\mu) = a_0 \mu^3 + a_1 \mu^2 + a_2 \mu + a_3 \quad \text{Equation 54b}$$

where $$a_0 = E[z_k^2], a_1 = -E[y_k z_k] + \rho_1 E[\text{sign}(y_k - \mu z_k) z_k] \quad \text{Equation 55a}$$

$$a_0 = E[z_k^4], a_1 = -3E[z_k^3 y_k], a_2 = 3E[y_k^2 z_k^2] - \rho_2 E[z_k^2],$$
$$a_3 = \rho_2 E[y_k z_k] - E[y_k^3 z_k] \quad \text{Equation 55b}$$

Optimum step sizes that minimize Equation 49 may be obtained for the cases with p=1 and p=2 by solving the polynomial equations $P^{(1)}(\mu)=0$ and $P^{(2)}(\mu)=0$, respectively.

The case with p=1 may be solved iteratively for $\mu$ using a fixed-point iteration of the form $$\mu^{(k)} = \frac{E[y_k z_k] + \rho_1 E[\text{sign}(y_k - \mu^{(k-1)} z_k) z_k]}{E[z_k^2]} \quad \text{Equation 56}$$

whereas the case with p=2 can be solved by finding the roots of the third-degree polynomial given by Equation 54b. If the number of real roots is greater than 1, a root that gives the lowest value of the functional in Equation 49 is chosen. If two of the roots are complex conjugate and the third root is real, then the real root is chosen as the optimum step size.

The selection of $\mu$ using the aforementioned procedure employs some training since the coefficients of the polynomials in Equation 54 depend on the statistics of the signals $y_k$ and $z_k$, which themselves depend on the equalizer taps ($z_k$ depends on the error $e_k^p$, which depends on $y_k$). One approach to perform such a training is to use the MMSE equalizer to generate $y_k$ and $z_k$, and then estimate the necessary statistics to compute the coefficients of the polynomials given by Equation 54. Once the roots of these polynomials are determined, the step sizes for p=1 and p=2 may be obtained.

Figure 9:
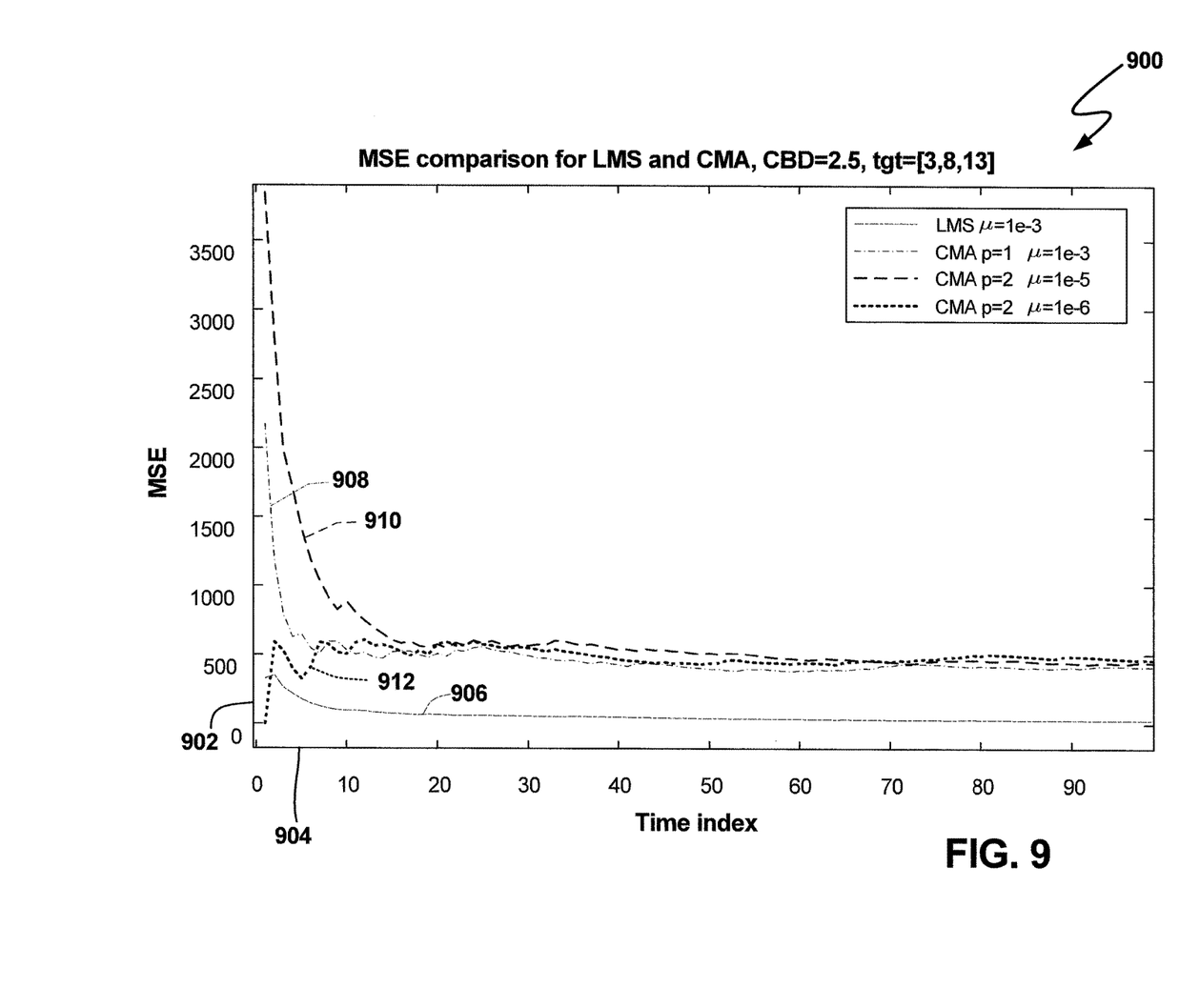
FIG. 9 is a graph of experimental results.

FIG. 9 is a graph 900 illustrating the mean square error (MSE) convergence comparisons for LMS and CM equalizer algorithms. The example shown in FIG. 9 employs a channel bit density (CBD)=2.5 and utilizes an optimum target g=[3, 8, 13]. In FIG. 9, vertical axis 902 represents MSE and horizontal axis 904 is a time index axis. Plot 906 is based on MSE convergence results of an LMS equalizer algorithm utilizing a value of adaptation step size $\mu=1e^{-3}$. Plot 908 is based on MSE convergence results of a CM equalizer algorithm with p=1 and adaptation step size $\mu=1e^{-3}$. Plots 910 and 912 are based on MSE convergence results of a CM equalizer algorithm with p=2 and adaptation step size values of $\mu=1e^{-5}$ and $\mu=1e^{-6}$, respectively. As can be seen in FIG. 9, convergence takes place in all of plots 906-912, with convergence in LMS plot 906 taking place more rapidly, as expected.

Figure 10:
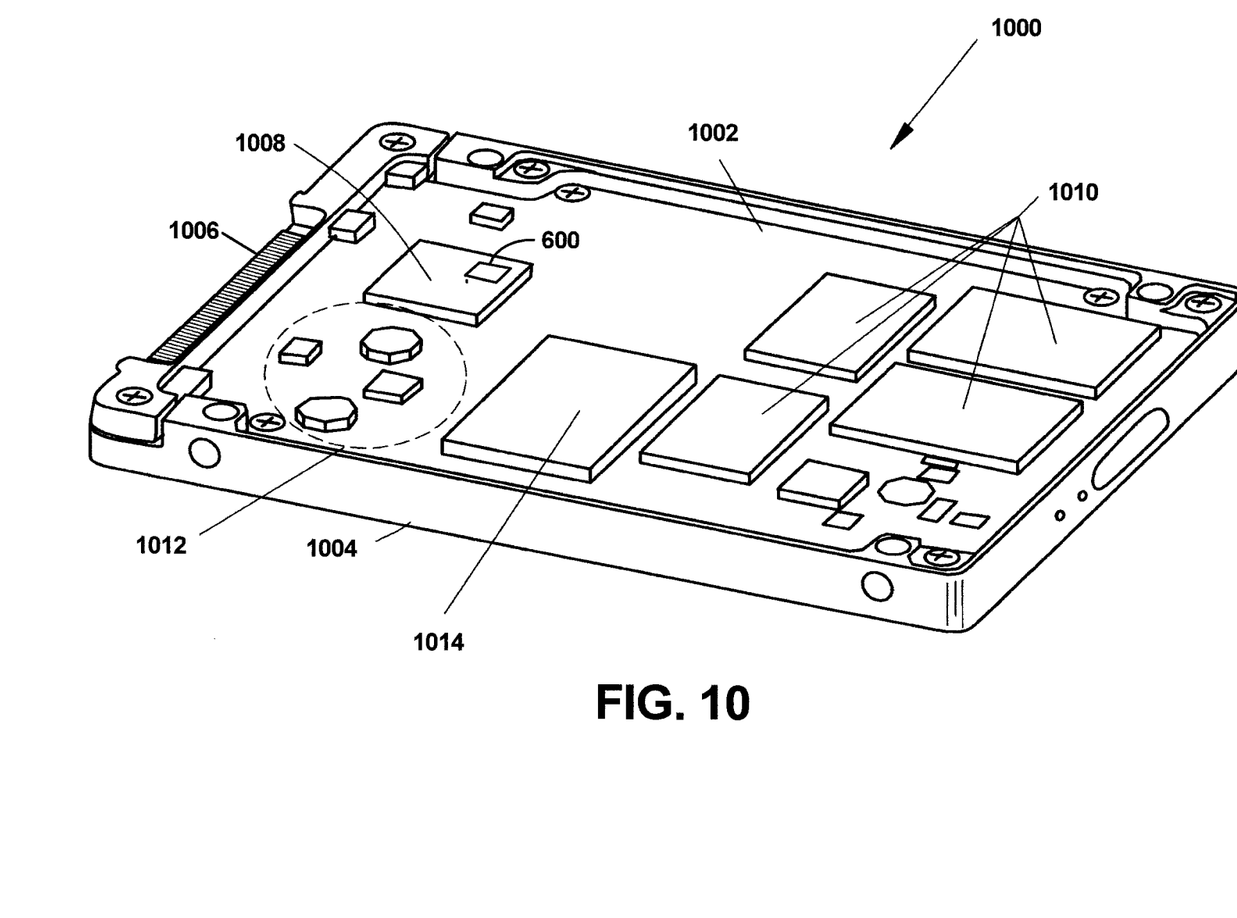
FIG. 10 is an isometric view of a solid-state drive that employs equalization technique in accordance with one embodiment.

FIG. 10 illustrates an oblique view of a solid state drive (SSD) 1000 in accordance with one embodiment, which includes an equalizer circuit of the type shown in FIG. 6, for example. SSD 1000 includes one or more circuit card assemblies 1002 and typically includes a protective, supportive housing 1004, a top cover (not shown), and one or more interface connectors 1006. SSD 1000 further includes a controller ASIC 1008, one or more non-volatile memory devices 1010, and power regulation circuitry 1012. The memory devices 1010 are essentially the SSD's data storage media. SSD 1000 may include erasure blocks as the physical storage locations within memory device 1010, which may include Flash memory devices, for example. In some applications, SSD 1000 further includes a power-backup energy storage device, such as a super-capacitor 1014.

In accordance with certain aspects, the SSD 1000 includes a circuit card assembly 1002 that includes a connector 1006 for connection to a host computer (not shown in FIG. 10). In accordance with certain aspects, the connector 1006 includes a NVMe, SAS, FC-AL, SCSI, PCI-E, IDE, AT, ATA, SATA, IEEE-1394, USB or other interface connector adapted for connection to a host computer.

In SSD 1000, ASIC controller 1008 may include equalizer circuit 600 described above. In such an embodiment, ASIC controller 1008 and equalizer circuit 600 may be a single ASIC (e.g., a SOC). In some embodiments, components of equalizer circuit 600 may comprise one or more ICs that are separate from ASIC controller 1008. In some embodiments, equalizer circuit 600 may comprise program code that is stored in a memory within controller ASIC 1008. The program code may be executed by a microprocessor within controller ASIC 1008.

Data form a host computer (not shown in FIG. 10) is received in SSD 1000 via connector 1006. That received data is provided to drive controller ASIC 1008, which stores the data in one or more memory devices 1010. In response to a request by a host computer for data stored in SSD 1000, information read from memory device(s) 1010 to satisfy the request is processed by equalizer circuit 600 or 700 before it is sent from SSD 1000 to the host computer.

In accordance with various embodiments, the equalization methods described herein may be implemented as one or more software programs running on one or more computer processors or controllers, such as those included in devices 100 and 1000. Dedicated hardware implementations including, but not limited to, application specific ICs, programmable logic arrays and other hardware devices can likewise be constructed to implement the equalization methods described herein.

In addition to the above-indicated computation time-saving aspects, the blind method for partial response equalization described above will make the task of other related loops (timing loop, gain loop, . . . , etc., shown in box 312 of FIG. 3, for example) in a communication channel much easier since there will be no delay from the detector when providing the detected sequence (e.g., the blind method does not need the detected bits).

The illustrations of the embodiments described herein are intended to provide a general understanding of the structure of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
receiving a data signal over a channel; and
equalizing the data signal, by a blind partial response equalizer circuit, to provide an equalized output of the data signal,
wherein an estimation of partial response equalizer taps employed to determine the equalized output, by the blind partial response equalizer circuit, is carried out independently of true channel input symbols and detected symbols corresponding to the data signal, and
wherein the estimation of the partial response equalizer taps is carried out by a constant modulus algorithm implemented in the blind partial response equalizer circuit, and wherein the constant modulus algorithm is derived from a constant modulus criterion that includes a dispersion parameter.

2. The method of claim 1 and wherein the equalization of the data signal is carried out by an equalizer filter of the blind partial response equalizer circuit, and wherein the equalizer output corresponds to a given target response.

3. The method of claim 2 and wherein the equalizer filter comprises the partial response equalizer taps that implement a finite impulse response (FIR) filter.

4. The method of claim 2 and further comprising providing the equalized output to a partial-response maximum-likelihood (PRML) type detector that removes remaining inter-symbol interference from the equalized output, wherein the PRML type detector is separate from the blind partial response equalizer circuit, and wherein the PRML type detector outputs the detected symbols.

5. The method of claim 1 and wherein the partial response equalizer taps are adapted by a gradient-based least mean squares algorithm implemented in the blind partial response equalizer circuit.

6. The method of claim 5 and further comprising providing input parameters to the blind partial response equalizer circuit, wherein the input parameters are independent of the true channel input symbols and the detected channel symbols, and wherein a first one of the input parameters is an adaptation step size parameter that has a value selected to ensure convergence of the gradient-based least mean squares algorithm.

7. The method of claim 6 and wherein a second one of the input parameters is a desired signal level parameter, and wherein a target is obtained based on a selected value for the desired signal level parameter.

8. The method of claim 1 and wherein the dispersion parameter comprises a positive real constant.

9. A data storage device comprising:
a data storage medium;
a read channel configured to process a data signal obtained from data stored on the data storage medium, wherein the read channel comprises a blind partial response equalizer circuit configured to provide an equalized output of the data signal, and
wherein the blind partial response equalizer circuit is configured to estimate partial response equalizer taps employed to determine the equalized output independently of true channel input symbols and detected symbols corresponding to the data signal, and
wherein the blind partial response equalizer circuit is further configured to estimate the partial response equalizer taps by a constant modulus algorithm that is derived from a constant modulus criterion that includes a dispersion parameter.

10. The data storage device of claim 9 and wherein the data signal is obtained from a read head that includes a single read sensor, and wherein the blind partial response equalizer circuit is a single-input and single-output (SISO) equalizer circuit.

11. The data storage device of claim 9 and wherein the data signal is obtained from a read head that includes a multiple read sensors, and wherein the blind partial response equalizer circuit is a multiple-input and single-output (MISO) equalizer circuit.

12. The data storage device of claim 11 and wherein the MISO equalizer circuit comprises a bank of different finite impulse response (FIR) filters, and wherein different outputs of the different FIR filters of the bank of different FIR filters are combined to provide the equalized output.

13. The data storage device of claim 9 and wherein the read channel further comprises a partial-response maximum-likelihood (PRML) type detector coupled to an equalizer filter of the partial response equalizer circuit, and wherein the PRML type detector is separate from the blind partial response equalizer circuit and is configured to remove remaining inter-symbol interference from the equalized output and provide the detected symbols.

14. The data storage device of claim 9 and wherein the data storage medium is at least one of a data storage disk or a solid-state memory.

15. A method comprising:
receiving a data signal over a channel;
equalizing the data signal, by a blind partial response equalizer circuit, to provide an equalized output of the data signal; and
providing the equalized output to a partial-response maximum-likelihood (PRML) type detector that removes remaining inter-symbol interference for the equalized output and provides detected symbols, wherein the PRML type detector is separate from the blind partial response equalizer circuit;
wherein an estimation of partial response equalizer taps employed to determine the equalized output, by the blind partial response equalizer circuit, is carried out independently of true channel input symbols and the detected symbols, and
wherein the estimation of the partial response equalizer taps is carried out by a constant modulus algorithm implemented in the blind partial response equalizer circuit, and wherein the constant modulus algorithm is derived from a constant modulus criterion that includes a dispersion parameter.

16. The method of claim 15 and wherein the equalization of the data signal is carried out by an equalizer filter of the blind partial response equalizer circuit, and wherein the equalizer output corresponds to a given target response.

17. The method of claim 16 and wherein the equalizer filter comprises the partial response equalizer taps that implement a finite impulse response (FIR) filter.

18. The method of claim 15 and wherein the partial response equalizer taps are adapted by a gradient-based least mean squares algorithm implemented in the blind partial response equalizer circuit.

19. The method of claim 18 and further comprising providing input parameters to the blind partial response equalizer circuit, wherein the input parameters are independent of the true channel input symbols and the detected channel symbols.

20. The method of claim 15 and wherein the dispersion parameter comprises a positive real constant.

* * * * *